(No Model.)
T. DONLON.
ANIMAL TRAP.
No. 518,024.                    Patented Apr. 10, 1894.
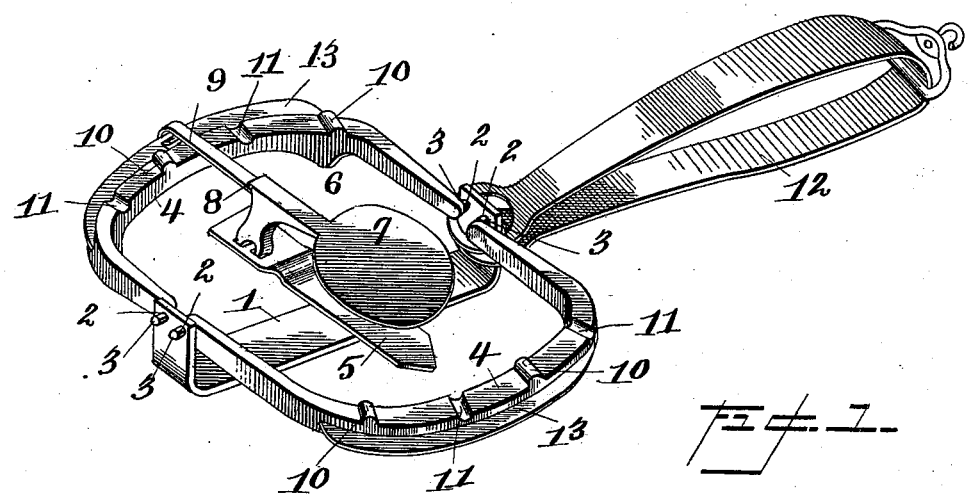
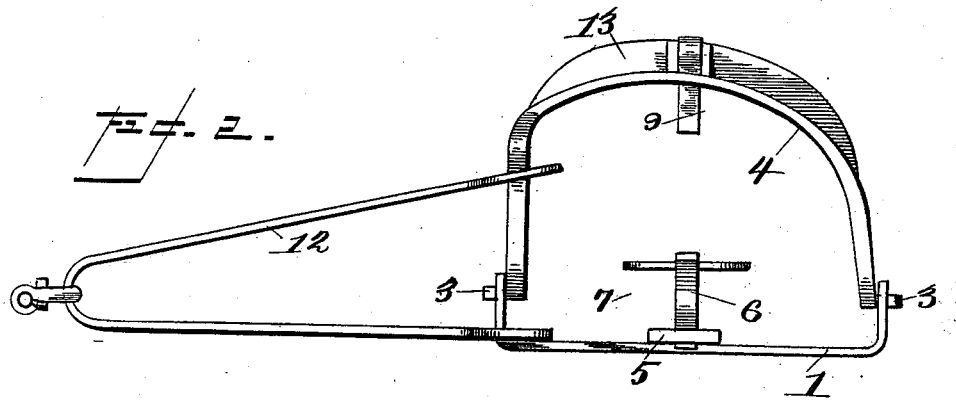
Witnesses
T. W. Johnson,
James G. Jester
Inventor
Thos. Donlon
By J. R. Nottingham
Attorney
THE NATIONAL LITHOGRAPHING COMPANY,
WASHINGTON, D. C.

UNITED STATES PATENT OFFICE.

THOMAS DONLON, OF ONEIDA, NEW YORK.

ANIMAL-TRAP.

SPECIFICATION forming part of Letters Patent No. 518,024, dated April 10, 1894.

Application filed December 14, 1893. Serial No. 493,662. (No model.)

*To all whom it may concern:*

Be it known that I, THOMAS DONLON, a citizen of the United States, residing at Oneida, in the county of Madison and State of New York, have invented certain new and useful Improvements in Animal-Traps; and I do hereby declare the following to be a full, clear, and exact description of the invention, such as will enable others skilled in the art to which it appertains to make and use the same.

My invention relates to improvements in that class of animal traps known as jaw-traps; and it consists essentially in providing inner faces of the jaws with a series of corresponding tongues and grooves and the outer edges with flanges, and it further consists in hinging a latch, which engages the trigger, to the inner face of one of the flanges on the jaw, so that when engaging said trigger the latch will hook over the face side of the jaw, as will be hereinafter more fully described and specifically pointed out in the claims. It is well known that in this class of traps the animal is almost invariably caught by the foot or lower part of the leg and it not infrequently occurs that in order to extricate itself it will gnaw off its leg, and it is to provide against this contingency that my invention is designed. By providing the jaws with approximately closing flanges, so that if the animal should be caught by the foot the flanges will cover nearly the entire leg, thereby preventing it from gnawing its leg at the point where it is caught and held by the jaws of the trap.

In the accompanying drawings: Figure 1 represents a perspective view of my improved trap, showing it in set position, and Fig. 2, a side elevation, showing it unset.

Referring to the drawings: The numeral 1 indicates the base-plate having its ends bent up at right angles thereto and provided with apertures 2, 2, in which are journaled the arms, 3, 3, of the jaws 4, 4. The said base-plate has attached to it a cross-plate 5, in which is hinged a trigger, 6, provided with a bait-plate, 7, said trigger and bait-plate being cast integral. The trigger is notched, as indicated by the numeral 8 to receive the free end of a latch, 9, hinged to one of the jaw-flanges. The inner faces of the jaws are provided with alternate tongues 10 and grooves 11, which fit into each other when the trap is sprung, and serve to lock said jaws together, in which position they are tightly held by the force exerted by the actuating-spring 12, which is of the usual construction in this class of traps. Each of the jaws is provided with a flange, 13, which is preferably cast integral with said jaws, and are so formed that when the trap is sprung they will come approximately close together.

When the trap is set the free end of the hinged-latch engages the notch 8, of the trigger, and the upward pressure exerted by the actuating-spring tends to hold the trigger, and its bait-plate, in an elevated position, but a slight downward pressure upon the bait-plate will cause the free end of the hinged latch to be withdrawn from its engagement with the notch 8 and spring the trap. The upward pressure upon the hinged latch exerted by the actuating spring, through the medium of the jaw, to which said trigger is attached causes sufficient frictional contact between the trigger and latch, to hold the parts when the trap is set, the trigger and latch being so arranged relatively to each other, that the weight of the animal upon the bait plate, will throw the trigger and catch out of their relative positions, destroying the frictional contact, and permitting the trap to close.

Having thus fully described my invention, what I claim as new, and desire to secure by Letters Patent, is—

1. In a trap, the combination, with the base plate, and the hinged trigger and bait plate, of a latch hinged to one of the jaws, and the actuating spring, whereby an upward pressure is brought to bear upon the latch and hold it in frictional contact with the notch of the latch plate, substantially as specified.

2. In a trap, the combination with the base plate and the hinged trigger provided with a notch at its rear, of the latch hinged to one of the jaws, and the actuating spring, whereby the jaws are closed against each other, and the latch held in frictional contact with the trigger when the trap is set, substantially as specified.

3. In a trap, the combination, with the base-plate, the cross-bar attached thereto, and the trigger hinged to said cross-plate, of a pair of jaws having their inner faces tongued and grooved transversely and their outer edges provided with flanges, and a latch hinged to the flange of one of the jaws and adapted to engage a notch in said trigger, substantially as specified.

In testimony whereof I affix my signature in the presence of two witnesses.

THOMAS DONLON.

Witnesses:
   JOHN W. SUGGETT,
   EDWIN DUFFEY.